US012769873B2

(12) United States Patent
Yuan et al.

(10) Patent No.: US 12,769,873 B2
(45) Date of Patent: Oct. 20, 2026

(54) DISTRIBUTED DNS SECURITY INFRASTRUCTURE TO PRESERVE PRIVACY DATA

(71) Applicant: Cisco Technology, Inc., San Jose, CA (US)

(72) Inventors: Barry Qi Yuan, Vancouver (CA); Robert Edgar Barton, Richmond (CA)

(73) Assignee: Cisco Technology, Inc., San Jose, CA (US)

( * ) Notice: Subject to any disclaimer, the term of this patent is extended or adjusted under 35 U.S.C. 154(b) by 112 days.

(21) Appl. No.: 18/817,965

(22) Filed: Aug. 28, 2024

(65) Prior Publication Data

US 2024/0419841 A1 Dec. 19, 2024

Related U.S. Application Data

(63) Continuation of application No. 17/991,286, filed on Nov. 21, 2022, now Pat. No. 12,105,840.

(51) Int. Cl.
*G06F 21/62* (2013.01)
*H04L 61/4511* (2022.01)

(52) U.S. Cl.
CPC ...... *G06F 21/6245* (2013.01); *H04L 61/4511* (2022.05)

(58) Field of Classification Search
CPC . G06F 21/6245; H04L 61/4511; H04L 9/3236
See application file for complete search history.

(56) References Cited

U.S. PATENT DOCUMENTS 9,736,185 B1 * 8/2017 Belamaric ............... H04L 63/20
10,999,240 B1 5/2021 Osterweil et al.
11,038,897 B1 6/2021 Wilson et al.
11,303,606 B1 * 4/2022 Chew .................. H04L 45/7453
(Continued)

FOREIGN PATENT DOCUMENTS

CN 107770198 A 3/2018

OTHER PUBLICATIONS

Office Action for U.S. Appl. No. 17/991,286, mailed on Jul. 19, 2024, Yuan, (Distributed DNS Security Infrastructure to Preserve Privacy Data) 13 pages.
(Continued)

*Primary Examiner* — Hee Soo Kim
(74) *Attorney, Agent, or Firm* — Lee & Hayes, P.C.

(57) ABSTRACT

Techniques for leveraging a distributed Domain Name System (DNS) infrastructure for preserving Personally Identifiable Information (PII) data by creating a hash to policy pair (HPP) database on premises at an enterprise organization. A policy engine hosted on premises at an enterprise organization applies a cryptographic hash function to metadata including PII associated with a client of the enterprise organization to generate a client hash value. The HPP is created by mapping the client hash value to a set of DNS policy instructions associated with the client and stored in the HPP database. The HPP database in published to a DNS security service, such that the DNS security service can resolve a DNS query for the client of the enterprise organization absent knowledge of the PII associated with the client by mapping the client hash value included in the DNS query to the client HPP in the HPP database.

20 Claims, 5 Drawing Sheets

(56) References Cited

U.S. PATENT DOCUMENTS

| | | | | |
|---|---|---|---|---|
| 11,552,925 | B1 * | 1/2023 | Craciun | H04L 63/0428 |
| 11,985,105 | B2 * | 5/2024 | Thakar | H04L 61/10 |
| 11,991,291 | B1 * | 5/2024 | Solapurkar | H04L 61/4511 |
| 2012/0036352 | A1 * | 2/2012 | Tovar | H04L 61/2539<br>713/153 |
| 2016/0241509 | A1 | 8/2016 | Akcin | |
| 2017/0346855 | A1 | 11/2017 | Reddy et al. | |
| 2018/0113807 | A1 | 4/2018 | Foxhoven et al. | |
| 2019/0052658 | A1 * | 2/2019 | Clarke | H04L 63/1425 |
| 2022/0140996 | A1 | 5/2022 | Cebere et al. | |
| 2023/0315901 | A1 * | 10/2023 | Turney | G06F 21/602<br>726/27 |
| 2024/0214770 | A1 * | 6/2024 | Jones | H04W 12/64 |

OTHER PUBLICATIONS

The PCT Search Report and Written Opinion mailed Mar. 11, 2024 for PCT/US23/80532, 24 pages.

* cited by examiner

DISTRIBUTED DNS SECURITY INFRASTRUCTURE TO PRESERVE PRIVACY DATA

RELATED APPLICATIONS

This application claims priority to U.S. patent application Ser. No. 17/991,286, filed on Nov. 21, 2022; the entire contents of which are incorporated herein by reference.

TECHNICAL FIELD

The present disclosure relates generally to a distributed Domain Name System (DNS) model that preserves Personally Identifiable Information (PII) data by utilizing a Hash to Policy Pair (HPP) database containing a hash value representing client metadata paired with a DNS policy associated with the client.

BACKGROUND

A Domain Name System (DNS) query is generally used to obtain an Internet Protocol (IP) address corresponding to a particular domain name on the Internet. Essentially, DNS functions like "the phonebook of the Internet." A client may access information on the Internet through domain names, like cisco.com, whereas a web browser interacts through IP addresses. DNS is used to translate a domain name to an IP address so browsers can load an Internet resource on a client device for a user.

Typically, when a client submits a DNS query, a DNS security service translates the query into an IP address and applies a DNS security policy associated with the client. For example, if a client at an enterprise organization types in a search for "www.cisco.com" the DNS security service will resolve the query and the client will be taken to the corresponding web site. However, if the client types in "www.badwebsite.com" that is prohibited for clients associated with the enterprise organization, the client will be sent a blocking page relaying information that per organization policy, the web site is not allowed.

The DNS security service may use Personally Identifiable Information (PII) data associated with the client in order to apply a differentiated security policy for that particular client.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

DESCRIPTION OF EXAMPLE EMBODIMENTS

Overview

Figure 1:
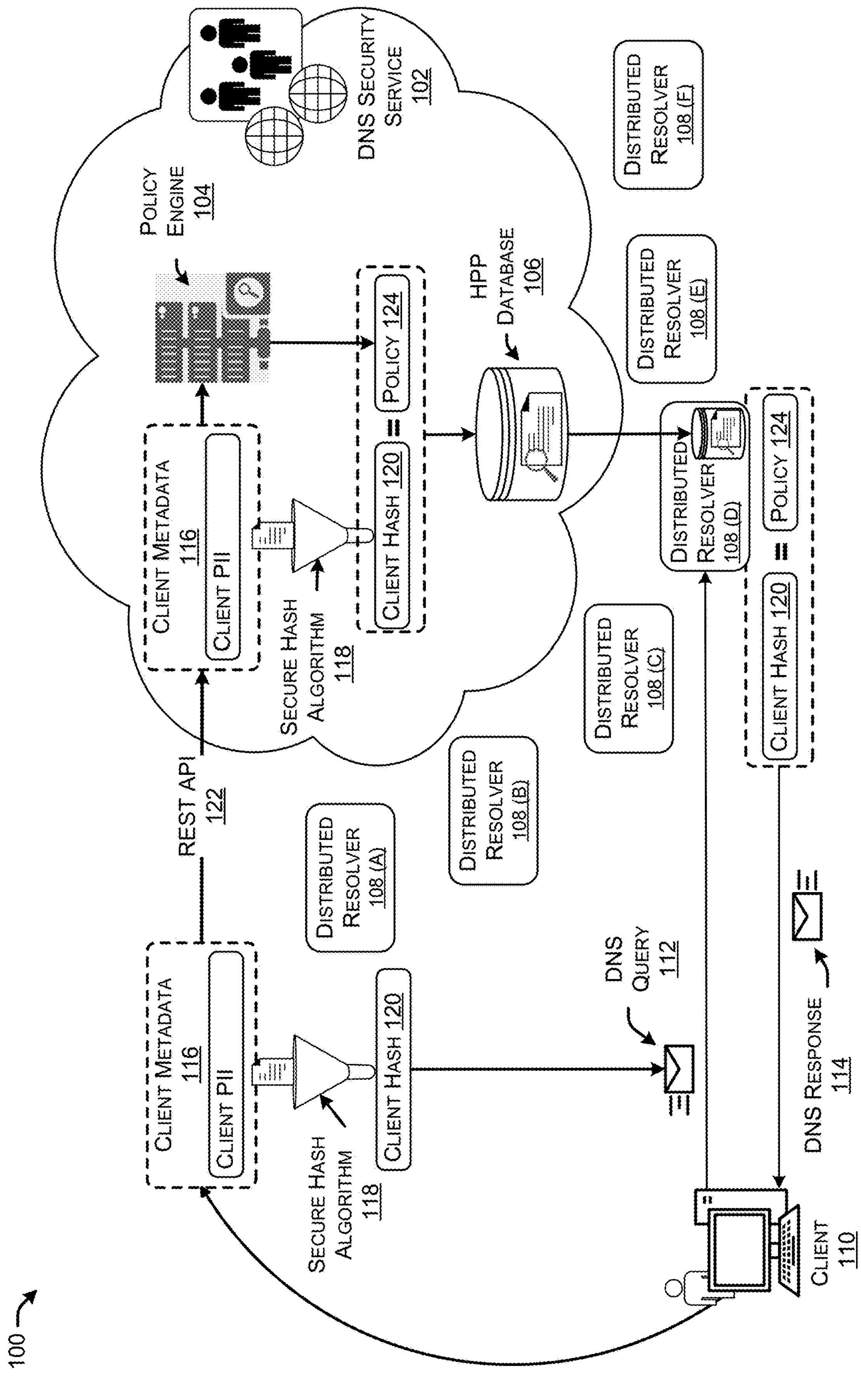
FIG. 1 illustrate a system-architecture diagram of an example environment for implementing at least some of the various technologies disclosed herein. The environment includes a distributed DNS architecture including a DNS security service and multiple distributed resolvers.

This disclosure describes a method for leveraging a distributed Domain Name System (DNS) model that preserves Personally Identifiable Information (PII) data by utilizing a Hash to Policy Pair (HPP) database containing a hash value representing client metadata paired with a set of DNS policy instructions associated with the client. The method is performed at least in part by a DNS security service and includes receiving metadata including PII associated with a client. Further, the method includes applying a cryptographic hash function to the metadata including PII associated with the client to generate a client hash value. The method may also include creating a client HPP by mapping the client hash value to a set of DNS policy instructions associated with the client. Further, the method may include storing the client HPP in a HPP database. Additionally, the method may include authorizing a distributed resolver to provide DNS services to the client. Finally, the method may include publishing the HPP database to the distributed resolver.

This disclosure describes an additional method for resolving a DNS query using a HPP database. The method may be performed at least in part by a distributed resolver and may include receiving, from a DNS security service, authorization to provide DNS services to a client. The method may also include subscribing to receive a HPP database containing a client HPP for the client, the client HPP pairing a client hash value, representing metadata including PII associated with the client, to a set of DNS policy instructions associated with the client. In some instances, the method may also include receiving a DNS query from the client including the client hash value in an additional records section of the DNS query. Finally, based at least in part on the client hash value, the method may include searching the HPP database for the client HPP.

Example Embodiments

Conventionally, a DNS security service is a single tier infrastructure that receives DNS queries from clients, applies a differentiated security policy associated with the client from which the query was received, resolves the query and sends a response back to the client. Ideally, partner and third-party data centers (e.g., Managed Service Providers (MSPs)) would be able to bundle and provide DNS security service like services to customers, essentially acting as a host for DNS security services. However, limiting factors prevent conventional single tier infrastructures from allowing this. In particular, DNS policies are built with sensitive customer information, and most MSPs would not easily be able to comply with Personally Identifiable Information (PII) regulatory requirements such as HIPPA, Federal Risk Authorization Management Program (FedRAMP), or General Data Protection Regulation (GDPR) for example. When applying current techniques, client identity and information like Username, hostname, IP address, PII, etc. are exposed to MSPs in an extended DNS (EDNS) query. Although some of the EDNS fields are hashed, there is still a one-to-one correlation of the hash function making it possible to extrapolate sensitive data such as PII data. Additionally, although ENDS today is able to leverage DNS encryption (e.g., DNSCrypt) this requires resources on both the client and server sides which adds performance overhead in terms of response time and packet size. Finally, DNS security services only have so many cloud DNS point of presence (POPs), but by working with MSPs or other third parties in a hierarchical fashion, a DNS security service can be far more dispersed and provide better DNS response time, which significantly improves user experience.

This disclosure describes techniques for leveraging a multi-tier distributed DNS architecture that preserves Personally Identifiable Information (PII) using a policy engine to create and maintain a Hash to Policy Pair (HPP) database. A DNS security service (e.g., Cisco Umbrella) may authorize one or more MSPs to resolve DNS queries from clients. Currently, because of the sensitive nature of PII, some enterprise organizations require regulatory compliance (e.g., HIPPA, FedRAMP, GDPR, etc.) that renders such authorization prohibitive. The techniques described herein enable DNS security service partners (e.g., MSPs) and customers or clients, to participate in hosting DNS security services, thereby reducing latency and increasing performance and privacy of the service. By leveraging partner and third-party data centers to host DNS security services, little to no change to current DNS security service infrastructure is necessary, while at the same time performance and response time is enhanced by being able to dramatically increase the number of data centers and get as close as possible to global clients and eliminate the need to encrypt an entire DNS packet with DNSCrypt. Additionally, privacy and compliance are improved because client identity is not exposed to third parties including hosting partners, and cannot be reverse engineered, because partners and third parties are allowed to host DNS security services without seeing client identity. Additionally, deployment options are simplified as the logic of the lower tier distributed resolvers are very simple and can be hosted in a container(s) or virtual machine (s) (VMs) that requires very little resources, and a deployment process can be automated.

By employing improved capabilities of Extension mechanism for DNS (EDNS), a hash representing client metadata, including the client PII, may be added as an OPT pseudo-RR to an additional records section of an EDNS query. (Although DNS is generally used herein to describe a Domain Name System query and response, it should be noted that Extension Mechanism for DNS and the properties that the EDNS provides, is generally assumed to be in use for the enhanced queries that include a hash representing client metadata and the associated responses described.) A policy engine uses the real client metadata to generate a security policy for the client. The policy engine pairs a client hash with a set of DNS security policy instructions associated with the client. This "Hash to Policy Pair" (HPP) is record that may be stored in a HPP database that is published by a DNS security service, using a Pub/Sub messaging model, to MSPs that have been authorized by the DNS security service to provide DNS services. When the MSP receives a DNS query having a client hash value as an OPT pseudo-RR in the additional records section of the query, the MSP can search the HPP database for the client hash value, and apply the security policy that is paired with the client hash value found in the HPP database. In this way, an MSP may resolve a DNS query and apply a policy to a client, without ever seeing the actual client metadata including PII.

Real client metadata, including the client PII, may be managed and stored by the policy engine at a PII regulatory compliant DNS security service, ensuring that all client PII handling is compliant with necessary regulations (e.g., HIPPA, FedRAMP, GDPR, etc.). MSPs may function as satellites of the DNS security service without having to directly deal with PII challenges, yet still apply DNS security policies associated with a client, without ever knowing who a client is or any client PII data.

Alternately or in addition, in some situations, client PII is so sensitive (e.g., customers such as the US federal government, HIPPA compliant customers, etc.), that the client does not want any sensitive PII data shared with the cloud, and thus, may not even allow the DNS security service to handle the real client metadata including the client PII. In these situations, the client themselves may host the policy engine on client premises. Thus, the management of the real client metadata, the generation of DNS security polies for the client, and the client HPPs are all on premises at the customer. The customer may then transmit the client HPP information to the DNS security service, and in turn the DNS security service may still publish the HPP database to subscribing MSPs. Alternately or in addition, the customer may transmit the HPP database directly to MSPs that function as authorized distributed resolvers. In this scenario, only the customer will ever see the real client metadata including PII, yet both the DNS security service, and authorized distributed resolvers (e.g., MSPs) may resolve DNS queries for the client using the HPP database to apply a DNS security policy associated with the client.

A client collects client metadata including but not limited to client IP address, Username, Hostname of the client, MDM information, and PII. A cryptographic hash function (e.g., any secure hash algorithm such as SHA256) is applied to the metadata and the resulting client hash value is added as an OPT pseudo-RR to an additional records section of the DNS query. In some cases, to add additional security, salt may be added to the hash to ensure a unique output for a set of metadata describing a particular client and client device. The hash is a unique identifier of the client PII identity and state. The state indicates the current situation of the client, for example, if the client IP address changes, the hash would change because the IP address is part of the metadata. The real client metadata including the client PII, is sent to the DNS security service via an out of band API, or inline with DNS and encryption.

Once the DNS security service receives the real client metadata, a policy engine generates a DNS security policy for the client based on the real client metadata received. Once the policy is generated, the policy is paired with the client hash value, that has been generated using the cryptographic hash function, to create the client HPP. The client HPP is then stored in a HPP database. The HPP database is then published by the DNS security service to subscribing authorized distributed resolvers using a Pub/Sub messaging model.

An external partner of the DNS security service (e.g., an MSP) is authorized to be a distributed resolver by the DNS security service to provide DNS security services for an organization or a set of client, such that all clients in the organization use the MSP as a local extension of the DNS security service. The client PII data is not kept at the MSP, instead it is centrally kept and managed by the DNS security service (in some cases the client PII is kept and managed on premises at the customer), which already complies with the necessary government regulations regarding customer PII data. Thus, while the MSP locally resolves DNS queries based on a policy, the MSP does not have any details of the actual client PII.

As described above, a client uses a client hash value, generated by applying a cryptographic hash function to metadata associated with the client including client PII, to identify itself. The DNS security service has a corresponding set of hash values, which are used to link a policy, generated by the policy engine using the real client metadata, to the customer or client. The techniques described herein leverage a Hash to Policy Pair (HPP) database. A HPP is essentially a mapping table of client hash values to a set of policy instructions describing how to handle a DNS query for a client, informing a remote DNS resolver what to do without looking at any client PII data. The HPP database is published in real-time to the distribute resolvers (e.g., MSPs or sensitive customers). Thus, as policy updates are made for a customer in the DNS security service, an update to the HPP database is made and synchronized with all subordinate DNS security service tiers in near real-time, using a Pub/Sub messaging model. Additionally, if the real client metadata changes (e.g., a state change resulting in a client IP address change), the client hash will change, resulting in a change in the client HPP. The change in the client HPP triggers an update in the HPP database, which is again, synchronized with all authorized distributed resolvers in the multi-tier distributed DNS architecture.

When a client sends an enhanced DNS request to a local distributed resolver (e.g., an MSP authorized by a DNS security service such as a private 5G service provider), the client hash value is embedded in the DNS query from the source. The distributed resolver receives the query, examines the Hash value, searches the HPP database for the Hash value to determined what policy to apply, executes the policy locally, resolves the query and sends a response. In this way, the distributed resolver is never required to view, receive, or examine any client PII data, yet is able to locally execute DNS security policy for the client. The distributed resolver simply acts on the hash values published in the HPP database from the DNS security service which corresponds to a locally executed policy. Using an HPP database expedites the DNS process, as there is no need to lookup the client and find the corresponding client policy, the distributed resolver simply applies a policy based on a HPP mapping, and can send a DNS response immediately based on the hash to policy pairing.

In the event that a distribute resolver does not find a corresponding HPP mapping in the HPP database for a DNS query with a particular hash value, the distributed resolver will send the query up stream to the DNS security service for resolution. In the meantime, based on customer configuration, the distributed resolver can default allow and respond, wait, or redirect. In addition, a distributed resolver sends telemetry data to the DNS security service so the logs can be correlated down to packet level and can be back tracked.

Authorized distributed resolvers are not limited to resolving queries for enhanced DNS that includes a client hash as an OPT pseudo-RR in the additional records section of the DNS query, and requires a HPP database with the client HPP to resolve. In the event that a client sends a regular DNS query, which does not include a hash value identifying the client metadata, an authorized distributed resolver can locally resolve the query and send a response. Either a regular DNS query or an enhanced DNS query including a client hash, are easily and quickly resolved locally at an authorized distributed resolver.

As stated above, when a client state changes (e.g., client IP address changes) a new client Hash will be generated and the client metadata will be sent to the DNS security service, and a new Hash to Policy mapping will be generated by the policy engine, the HPP database will be updated with the new client HPP by the DNS security service and published to subscribing distributed resolvers. The type of metadata change that triggers a new client Hash value, can be defined by customer administration and can be modified as desired. Additionally, to avoid hash collisions, a unique customer or organizational identifier can be appended to the hash value globally.

FIG. 1 illustrates a multi-tier, distributed system-architecture diagram of an example environment 100 for implementing at least some of the various technologies disclosed herein. In particular, FIG. 1 illustrates an example distributed DNS system architecture in which a DNS security service 102 hosts a policy engine 104 that creates and maintains client hash to policy pairings (HPPs) and stores them in an HPP database 106 that is published to authorized, subscribing distributed resolvers 108, such as distributed resolver 108(D). The environment 100 includes a cloud-based DNS security service 102 and multiple distributed resolvers 108 (distributed resolver 108(A)-distributed resolver 108(F)). The distributed resolvers 108 may be MSPs that are authorized by the DNS security service 102 to bundle and provide DNS services to an organization or set of clients, thus, acting as a local extension of the DNS security service 102. For example, distributed resolver 108(B) may be an MSP such as a private 5G service provider that is located in close proximity to an enterprise organization for which the distributed resolver 108(B) is authorized by the DNS security service 102 to provide DNS services.

Client 110 may belong to an enterprise organization to which the distributed resolver 108(D) has been authorized to act as a local extension of the DNS security service 102. Thus, when the client 110 sends a DNS query 112, the distributed resolver 108(D) resolves the query locally for the DNS security service 102 and sends a DNS response 114 back to the client 110.

When client metadata, including client PII, is sensitive and required to be handled according to particular regulations (e.g., HIPPA, FedRAMP, GDPR, etc.), the local distributed resolver 108, may not be compliant with the necessary regulations. In such cases, EDNS capabilities may be leveraged. For example, client metadata 116 that includes client PII may have a cryptographic hash function (e.g., any secure hash algorithm such as SHA 256) applied to it. FIG. 1 illustrates secure hash algorithm 118 applied to the client metadata 116 resulting in a client hash value 120 that represents the identity of client 110. In some cases, to add additional security, salt may be added to the hash to ensure a unique output for a set of metadata. Alternately or in addition, to avoid hash collisions, a unique customer or organization identifier may be appended to the hash value. The client hash 120 is added as an OPT pseudo-RR to an additional records section of the DNS query 112.

The real values of client metadata 116, are sent to the DNS security service 102 on and out-of-band encrypted channel such as through a REST API 122 illustrated in FIG. 1. Alternately or in addition, the real client metadata may be sent in band to the DNS security service 102 through encrypted DNS. The DNS security Service 102 manages the real client metadata 116 and has a corresponding set of client hash values 120 which are used to link a policy to a customer of client. The DNS security service 102 hosts the policy engine 104 that generates a DNS security policy for a client and maps client hash values to the DNS security policy. The DNS security policy is a set of instructions describing how to handle a DNS query from each client. The resulting client HPP is stored in an HPP database 106. For example, the policy engine 104 generates policy 124 using the real client metadata 116 including client PII, and maps the policy to the client hash 120, that is a representation of client metadata 116 including client PII for client 110, effectively creating a client hash to policy pair (HPP) for client 110 which is then stored in the HPP database 106. The DNS security service 102 manages the HPP database 106 and publishes the HPP database 106 to subscribing authorized distributed resolvers 108, such as distributed resolver 108(D), using a Pub/Sub messaging model. Thus, when a client 110 sends a DNS query 112 containing a client hash 120, to distributed resolver 108(D), the distributed resolver 108(D) searches the HPP database 106 for the client HPP that includes the client hash 120. When the client hash 120 is found, the distributed resolver 108(D) looks at a policy in the client HPP, associated with the client hash 120, such as policy 124 as illustrated in FIG. 1. The distributed resolver 108(D) can apply policy 124 associated with client hash 120, resolve the DNS query 112 and send the DNS response 114 back to client 110. Thus, the distributed resolver 108(D) can locally apply a policy 124 associated with client 110, without knowing the identity of client 110, or ever seeing any identifying information regarding client 110.

In the event that distributed resolver 108(D) receives a DNS query 112 from client 110 with a client hash 120 as an OPT pseudo-RR in the additional records section of the query, but does not find a corresponding HPP mapping in the HPP database for client hash 120, distributed resolver 108 (D) will send the query up stream to DNS security service 102 for resolution. In the meantime, based on customer configuration, distributed resolver 108(D) may default allow and respond, wait, or redirect.

Figure 2:
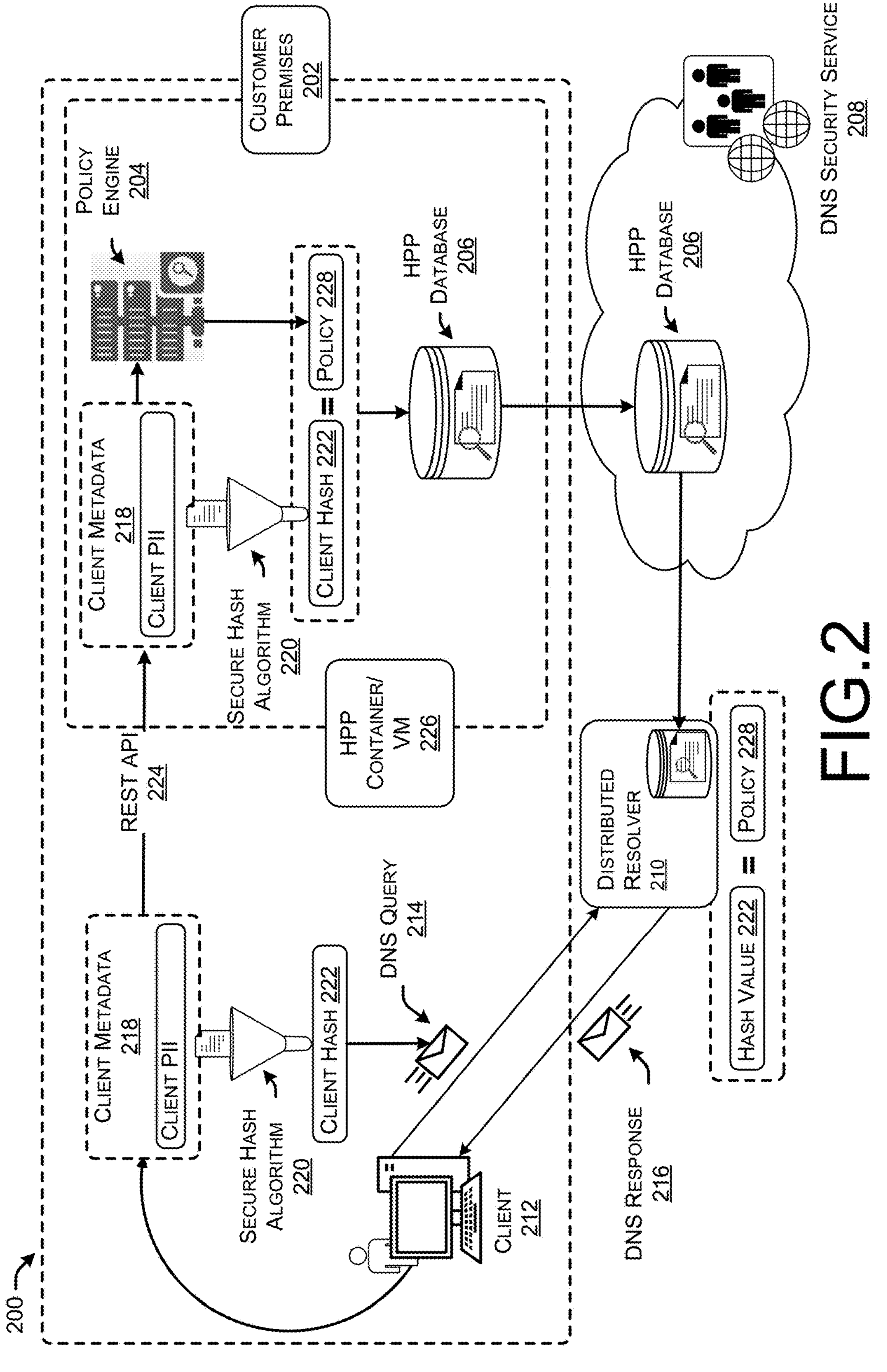
FIG. 2 illustrates a system-architecture diagram of an example environment for implementing at least some of the various technologies disclosed herein. The environment includes a distributed DNS architecture including a DNS security service, a distributed resolver, and a policy engine hosted on customer premises.

FIG. 2 illustrates a multi-tier, distributed system-architecture diagram of an example environment 200 for implementing at least some of the various technologies disclosed herein. Specifically, FIG. 2 illustrates an example distributed system-architecture in which a customer with particularly sensitive client PII (e.g., US government agency such as DoD) docs not want any sensitive PII data shared with the cloud. In this situation, the policy engine may be hosted by the customer instead of a DNS security service. Thus, the client hash to policy pairing (HPP) and the HPP database are created and maintained, on premises by the customer. The customer may then transmit the client HPPs in the HPP database to a DNS security service. In this way the DNS security service still has access to all the up to date HPP information without ever seeing any sensitive customer PII. The DNS security service may still publish the HPP database to subscribing distributed resolver in the same way as described with reference to FIG. 1. Alternately or in addition, the customer hosting the policy engine may directly transmit the up to date HPP database to remote resolvers.

The example environment 200 of FIG. 2 includes a customer premises 202 for a customer with particularly sensitive client PII that the customer does not want to share with the cloud. The customer, at the customer premises 202, hosts the policy engine 204 that generates DNS security policy, and creates and maintains client hash to policy pairings and stores them in a HPP database 206 that may be transmitted to a DNS security service 208. The DNS security service 208 may authorize one or more distributed resolvers 210 to act as local extensions of the DNS security service 208. The distributed resolvers 210 may be authorized by the DNS security service 208 to bundle and provide DNS services to an organization or set of clients. It the example environment 200, the distributed resolver 210 is authorized by the DNS security service 208 to provide DNS services to clients (e.g., client 212) at customer premises 202. Thus when client 212 sends a DNS query 214, the distributed resolver 210 resolves the query locally for the DNS security service 208 and sends a DNS response 216 back to the client 212.

To handle particularly sensitive client metadata and PII 218, techniques described herein leverage EDNS capabilities. Client metadata 218 that includes client PII may have a cryptographic hash function (e.g., any secure hash algorithm such as SHA 256) applied to it. FIG. 2 illustrates secure hash algorithm 220 applied to the client metadata 218 resulting in a client hash value 222 that represents the identity of client 212. In some cases, to add additional security, salt may be added to the hash to ensure a unique output for a set of metadata. Alternately or in addition, to avoid hash collisions, a unique customer or organization identifier may be appended to the hash value. The client hash 222 is added as an OPT pseudo-RR to an additional records section of the EDNS query 214.

The real values of client metadata 218 including the sensitive client PII, are sent to a container, Virtual Machine (VM), or other appropriate mechanism, via a REST API 224 for example, where the policy engine 204 is hosted. The HPP container/VM 226 contains the real client metadata 218 and a corresponding set of client hash values which are used to link a policy to a client. The policy engine 204 generates policy based on the real client metadata including client PII and maps client hash values to a set of policy instructions describing how to handle a DNS query from each client, and stores the hash to policy pairing in an HPP database 206. For example, the policy engine 204 maps client hash 222, that is a representation of client metadata 218 including client PII for client 212, to a DNS security policy 228 that is associated with client 212, creating a client HPP for client 212 which is then stored in the HPP database 206. The customer can transmit the HPP database 206 to the DNS security service 208. The DNS security service 208 may then publishes the HPP database 206 using a Pub/Sub messaging model to subscribing authorized distributed resolvers 210 as shown. Alternately or in addition, the customer may transmit the HPP database 206 directly to the distributed resolver 210. Thus, when a client 212 sends a DNS query 214 containing a client hash 222, to distributed resolver 210, the distributed resolver 210 searches the HPP database 206 for the client HPP that includes the client hash 222. When the client hash 222 is found, the distributed resolver 210 looks at a policy in the client HPP, associated with the client hash 222, such as policy 228 as illustrated in FIG. 2. The distributed resolver 210 can apply policy 228 associated with client hash 222, resolve the DNS query 214 and send the DNS response 216. Thus, the distributed resolver 210 can apply a policy 228 associated with client 212, without ever seeing any identifying information regarding client 212.

Figure 3:
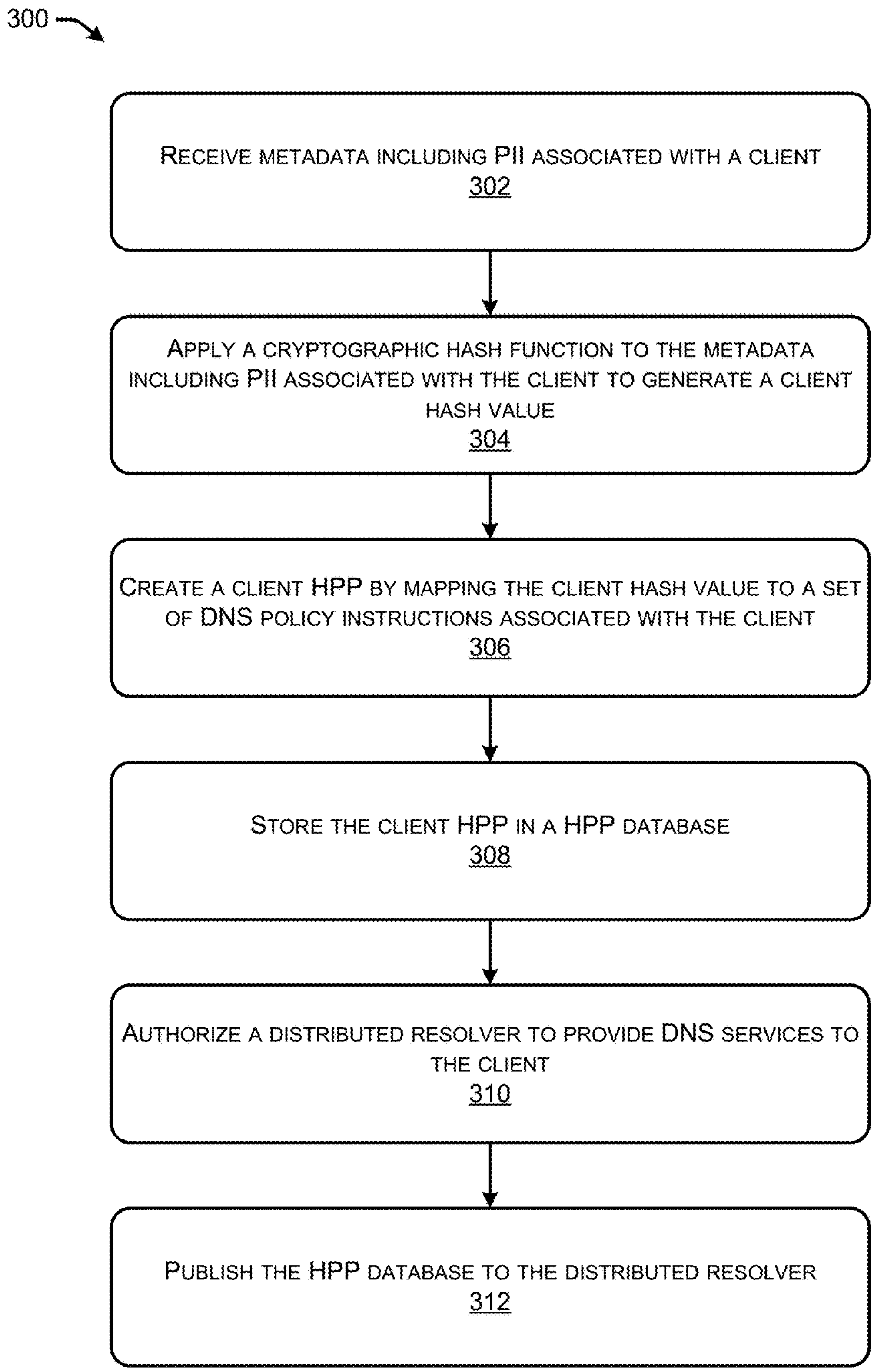
FIG. 3 illustrates a flow diagram of an example method performed at least in part by a DNS security service for authorizing distributed resolvers and publishing a HPP database.

FIG. 3 and illustrates flow diagrams of example process 300 that illustrate aspects of the functions performed at least partly by the DNS security service 102 as described in FIG. 1. The logical operations described herein with respect to FIG. 3 may be implemented (1) as a sequence of computer-implemented acts or program modules running on a computing system and/or (2) as interconnected machine logic circuits or circuit modules within the computing system.

The implementation of the various components described herein is a matter of choice dependent on the performance and other requirements of the computing system. Accordingly, the logical operations described herein are referred to variously as operations, structural devices, acts, or modules. These operations, structural devices, acts, and modules can be implemented in software, in firmware, in special purpose digital logic, and any combination thereof. It should also be appreciated that more or fewer operations might be performed than shown in FIG. 3 and as described herein. These operations can also be performed in parallel, or in a different order than those described herein. Some or all of these operations can also be performed by components other than those specifically identified. Although the techniques described in this disclosure is with reference to specific components, in other examples, the techniques may be implemented by less components, more components, different components, or any configuration of components.

At operation 302, The DNS security service receives metadata including PII associated with a client. For example as shown in FIG. 1, the DNS security service 102 receives client metadata 116 that include client PII from a REST API 122. The client metadata 116 is associated with client 110.

At operation 304, a cryptographic hash function is applied to the metadata including PII associated with the client to generate a client hash value. For example, FIG. 1 shows secure hash algorithm 118 applied to the client metadata 116 to generate client hash 120. Optionally, the hash may be salted, or additional unique data added to the metadata associated with the client before the secure hash algorithm is applied to the metadata. Alternately or in addition, a unique customer or organizational identifier can be appended to the hash value globally.

At operation 306, a client HPP is created by mapping the client hash value to a set of DNS policy instructions associated with the client. For example, FIG. 1 shows the HPP mapping of client hash value 120 to policy 124. The policy engine 104 generates the policy 124 for client 110 using the client metadata 116 and maps the policy to the client hash 120.

At operation 308, the client HPP is stored in a HPP database. For example in FIG. 1, the client HPP mapping of client hash 120 to policy 124 is stored as a client HPP for client 110 in the HPP database 106.

At operation 310, the DNS security service authorizes a distributed resolver to provide DNS services to the client. For example, in FIG. 1 the DNS security service 102 authorizes distributed resolver 108(D) to provide DNS services to client 110. Also shown in FIG. 1, DNS security service 102 has authorized distributed resolvers 108(A), 104(B), 104(C), 104(E), and 104(F) to provide DNS services to client 110 and/or other clients not shown that belong to the same or other organizations.

At operation 312, the DNS security service publishes the HPP database to the distributed resolver. For example, in FIG. 1, The DNS security service 102 publishes the HPP database 106 to the distributed resolver 108(D) using a Pub/Sub messaging model. Thus, when a change in the set of DNS policy instructions associated with client 110 occurs, or when a state change occurs for client 110, the HPP database 106 is updated and the updated database 106 is published to all subscribing distributed resolvers including distributed resolver 108(D).

Figure 4:
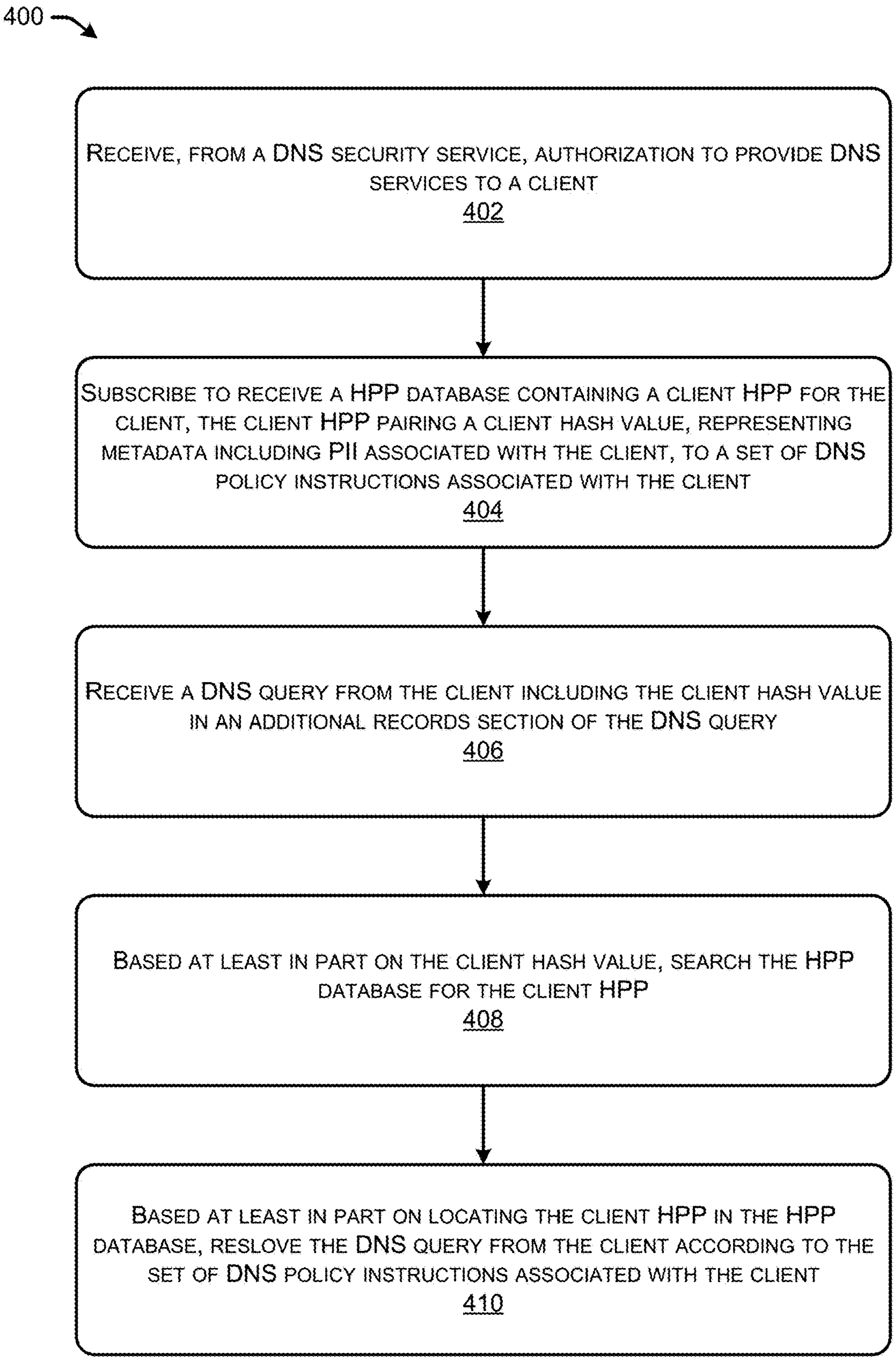
FIG. 4 illustrates a flow diagram of an example method performed at least in part by a distributed resolver for applying a policy based on a client hash to policy pairing and resolving a DNS query.

FIG. 4 illustrates a data flow diagram of an example process 400 that illustrate aspects of the functions performed at least partly a distributed resolver 108 as described in FIG. 1 and FIG. 2. The logical operations described herein with respect to FIG. 3 may be implemented (1) as a sequence of computer-implemented acts or program modules running on a computing system and/or (2) as interconnected machine logic circuits or circuit modules within the computing system.

The implementation of the various components described herein is a matter of choice dependent on the performance and other requirements of the computing system. Accordingly, the logical operations described herein are referred to variously as operations, structural devices, acts, or modules. These operations, structural devices, acts, and modules can be implemented in software, in firmware, in special purpose digital logic, and any combination thereof. It should also be appreciated that more or fewer operations might be performed than shown in FIG. 4 and as described herein. These operations can also be performed in parallel, or in a different order than those described herein. Some or all of these operations can also be performed by components other than those specifically identified. Although the techniques described in this disclosure is with reference to specific components, in other examples, the techniques may be implemented by less components, more components, different components, or any configuration of components.

At operation 402, a distributed resolver receives authorization from a DNS security service to provide DNS services to a client. For example in FIG. 1, the distributed resolver 108(D) is authorized by the DNS security service 102 to provide DNS services to client 110. Additionally, in FIG. 2 the distributed resolver 210 is authorized by the DNS security service 208 to provide DNS services to client 212.

At operation 404, the distributed resolver subscribes to receive a HPP database containing a client HPP for the client, the client HPP pairing a client hash value, representing metadata including PII associated with the client, to a set of DNS policy instructions associated with the client. For example, In FIG. 1 the distributed resolver 108(D) subscribes to receive the HPP database 106. The HPP database contains client HPP for the client 110 which pairs the client hash 120, representing the client metadata 116, with policy 124 associated with client 110. In another example, with reference to FIG. 2, the distributed resolver 210 subscribes to receive the HPP database 206. The HPP database contains client HPP for the client 212 which pairs the client hash 120, representing the client metadata 218, with policy 228 associated with client 212.

At operation 406, the distributed resolver receives a DNS query from the client including the client hash value in an additional records section of the DNS query. For example, in FIG. 1, the distributed resolver 108(D) receives DNS query 112 from client 110, the DNS query 112 including client hash 120 in the additional records section of DNS query 112. With reference to FIG. 2, the distributed resolver 210 receives DNS query 214 from client 212, the DNS query 214 including client hash 222 in the additional records section of DNS query 214.

At operation 408, the distributed resolver searches the HPP database for the client HPP, based at least in part on the client hash value. For example, in FIG. 1 the distributed resolver 108(D) searches the HPP database 106 for the client HPP (e.g., client hash 120 paired with policy 124) based on the client hash 120. With reference to FIG. 2, the distributed resolver 210 searches the HPP database 206 for the client HPP (e.g., client hash 222 paired with policy 228) based on the client hash 222.

At operation 410, based at least in part on locating the client HPP in the HPP database, the distributed resolver resolves the DNS query from the client according to the set of DNS policy instructions associated with the client. For example, in FIG. 1 the distributed resolver 108(D) locates the client hash 120 in the HPP database 106 and resolves the DNS query 112 based on the policy 124 associated with the client hash 120. The distributed resolver 108(D) then sends the DNS response 114 to the client 110 without ever seeing any of the client metadata 116 including client PII. With reference to FIG. 2, the distributed resolver 210 locates the client hash 222 in the HPP database 206 and resolves the DNS query 214 based on the policy 228 associated with the client hash 222. The distributed resolver 210 then sends the DNS response 216 to the client 212 without ever seeing any of the client metadata 218 including client PII.

Figure 5:
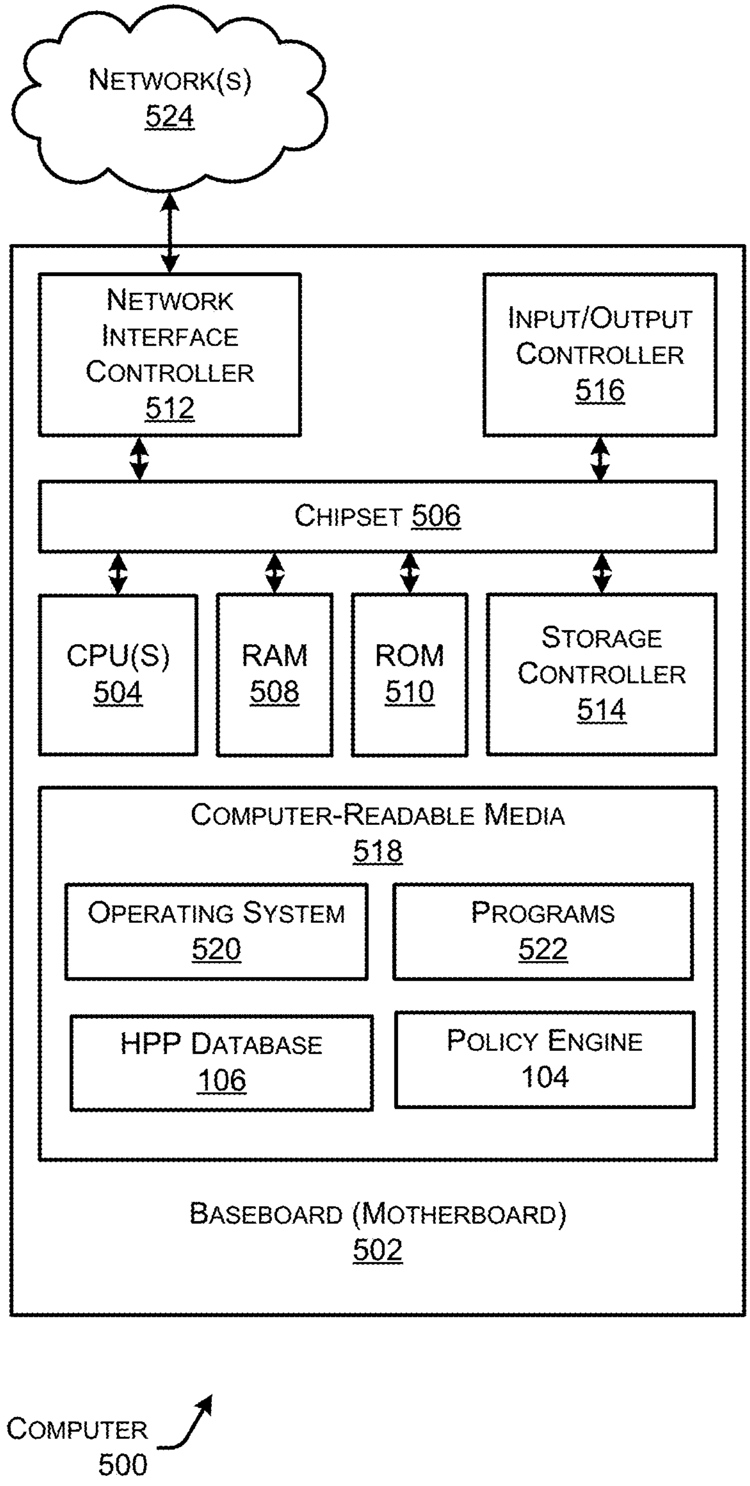
FIG. 5 illustrates a computer architecture diagram showing an example computer hardware architecture for implementing a network device that can be utilized to implement aspects of the various technologies presented herein.

FIG. 5 shows an example computer architecture for a computer 500 capable of executing program components for implementing the functionality described herein. The computer architecture shown in FIG. 5 illustrates a conventional server computer, workstation, desktop computer, laptop, tablet, network appliance, e-reader, smartphone, or other computing device, and can be utilized to execute any of the software components presented herein. The computer 500 may, in some examples, correspond to any of the servers, routers, or devices discussed herein. In some embodiments, computer 500 may include networked devices such as servers, switches, routers, hubs, bridges, gateways, modems, repeaters, access points, firewalls etc. Additionally, in some implementations, the programs or software discussed herein may be configured to perform operations performed by any of the devices. In some instances, the computer may correspond to any device described herein and be configured to perform operations performed by any device, and/or may be a system of devices that perform the techniques described herein.

The computer 500 includes a baseboard 502, or "motherboard," which is a printed circuit board to which a multitude of components or devices can be connected by way of a system bus or other electrical communication paths. In one illustrative configuration, one or more central processing units ("CPUs") 504 operate in conjunction with a chipset 506. The CPUs 504 can be standard programmable processors that perform arithmetic and logical operations necessary for the operation of the computer 500.

The CPUs 504 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 506 provides an interface between the CPUs 504 and the remainder of the components and devices on the baseboard 502. The chipset 506 can provide an interface to a RAM 508, used as the main memory in the computer 500. The chipset 506 can further provide an interface to a computer-readable storage medium such as a read-only memory ("ROM") 510 or non-volatile RAM ("NVRAM") for storing basic routines that help to startup the computer 500 and to transfer information between the various components and devices. The ROM 510 or NVRAM can also store other software components necessary for the operation of the computer 500 in accordance with the configurations described herein.

The computer 500 can operate in a networked environment using logical connections to remote computing devices and computer systems through a network, such as the network 524. The chipset 506 can include functionality for providing network connectivity through a Network Interface Controller (NIC) 512, such as a gigabit Ethernet adapter. The NIC 512 is capable of connecting the computer 500 to other computing devices over the network 524. It should be appreciated that multiple NICs 512 can be present in the computer 500, connecting the computer to other types of networks and remote computer systems.

The computer 500 can be connected to a storage device 518 that provides non-volatile storage for the computer. The storage device 518 can store an operating system 520, programs 522, and data, which have been described in greater detail herein. The storage device 518 can be connected to the computer 500 through a storage controller 514 connected to the chipset 506. The storage device 518 can consist of one or more physical storage units. The storage controller 514 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 500 can store data on the storage device 518 by transforming the physical state of the physical storage units to reflect the information being stored. The specific transformation of physical state can depend on various factors, in different embodiments of this description. Examples of such factors can include, but are not limited to, the technology used to implement the physical storage units, whether the storage device 518 is characterized as primary or secondary storage, and the like.

For example, the computer 500 can store information to the storage device 518 by issuing instructions through the storage controller 514 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 500 can further read information from the storage device 518 by detecting the physical states or characteristics of one or more particular locations within the physical storage units.

In addition to the mass storage device 518 described above, the computer 500 can have access to other computer-readable storage media to store and retrieve information, such as program modules, data structures, or other data. It should be appreciated by those skilled in the art that computer-readable storage media is any available media that provides for the non-transitory storage of data and that can be accessed by the computer 500. In some examples, the operations performed by devices described herein, and or any components included therein, may be supported by one or more devices similar to computer 500. Stated otherwise, some or all of the operations performed by the DNS security service 102, the policy engine 104, the HPP database 106, the distributed resolvers 108, and or any components included therein, may be performed by one or more computer devices 500 operating in a system.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage device 518 can store an operating system 520 utilized to control the operation of the computer 500. According to one embodiment, the operating system comprises the LINUX operating system. According to another embodiment, the operating system comprises the WINDOWS® SERVER operating system from MICROSOFT Corporation of Redmond, Washington. According to further embodiments, the operating system can comprise the UNIX operating system or one of its variants. It should be appreciated that other operating systems can also be utilized. The storage device 518 can store other system or application programs and data utilized by the computer 500.

In one embodiment, the storage device 518 or other computer-readable storage media is encoded with computer-executable instructions which, when loaded into the computer 500, transform the computer from a general-purpose computing system into a special-purpose computer capable of implementing the embodiments described herein. These computer-executable instructions transform the computer 500 by specifying how the CPUs 504 transition between states, as described above. According to one embodiment, the computer 500 has access to computer-readable storage media storing computer-executable instructions which, when executed by the computer 500, perform the various processes described herein. The computer 500 can also include computer-readable storage media having instructions stored thereupon for performing any of the other computer-implemented operations described herein.

The computer 500 can also include one or more input/output controllers 516 for receiving and processing input from a number of input devices, such as a keyboard, a mouse, a touchpad, a touch screen, an electronic stylus, or other type of input device. Similarly, an input/output controller 516 can provide output to a display, such as a computer monitor, a flat-panel display, a digital projector, a printer, or other type of output device. It will be appreciated that the computer 500 might not include all of the components shown in FIG. 5, can include other components that are not explicitly shown in FIG. 5, or might utilize an architecture completely different than that shown in FIG. 5.

As described herein, the computer 500 may comprise one or more of a router, a border router, a switch, and/or a server. The computer 500 may include one or more hardware processors 504 (processors) configured to execute one or more stored instructions. The processor(s) 504 may comprise one or more cores. Further, the computer 500 may include one or more network interfaces configured to provide communications between the computer 500 and other devices, such as the communications described herein. The network interfaces may include devices configured to couple to personal area networks (PANs), wired and wireless local area networks (LANs), wired and wireless wide area networks (WANs), and so forth. For example, the network interfaces may include devices compatible with Ethernet, Wi-Fi™, and so forth.

While the invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A method performed at least in part by a policy engine hosted on premises at an enterprise organization, the method comprising:

applying a cryptographic hash function to metadata including personally Identifiable Information (PII) associated with a client of the enterprise organization to generate a client hash value;

creating a client Hash to Policy Pair (HPP) by mapping the client hash value to a set of DNS policy instructions associated with the client;

storing the client HPP in a HPP database; and publishing the HPP database to a DNS security service, such that the DNS security service can resolve a DNS query for the client of the enterprise organization absent knowledge of the PII associated with the client by mapping the client hash value included in the DNS query to the client HPP in the HPP database.

2. The method of claim 1, further comprising:

updating the HPP database with an updated client HPP in response to a change in the set of DNS policy instructions associated with the client; and publishing the updated HPP database to the DNS service.

3. The method of claim 1, further comprising publishing the HPP database to a distributed resolver authorized by the DNS security service to provide DNS services to the enterprise organization.

4. The method of claim 3, wherein the DNS security service authorizes multiple distributed resolvers to provide DNS services to the enterprise organization and the HPP database is published, using a publish/subscribe messaging model, to the authorized distributed resolvers.

5. The method of claim 3, wherein the distributed DNS resolver is a Managed Service Provider (MSP).

6. The method of claim 1, wherein the PII associated with the client is maintained according to regulatory security requirements.

7. The method of claim 1, wherein the client hash value is added to an additional records section of a client DNS query.

8. A system comprising:

one or more processors; and one or more non-transitory computer-readable media storing computer-executable instructions that, when executed by the one or more processors, cause the one or more processors to perform operations comprising:

applying, by a policy engine hosted on premises at an enterprise organization, a cryptographic hash function to metadata including personally Identifiable Information (PII) associated with a client of the enterprise organization to generate a client hash value;

creating, by the policy engine, a client Hash to Policy Pair (HPP) by mapping the client hash value to a set of DNS policy instructions associated with the client;

storing the client HPP in a HPP database; and publishing, by the policy engine, the HPP database to a DNS security service, such that the DNS security service can resolve a DNS query for the client of the enterprise organization absent knowledge of the PII associated with the client by mapping the client hash value included in the DNS query to the client HPP in the HPP database.

9. The system of claim 8, the operations further comprising:

updating the HPP database with an updated client HPP in response to a change in the set of DNS policy instructions associated with the client; and publishing the updated HPP database to the DNS service.

10. The system of claim 8, the operations further comprising further comprising publishing the HPP database to a distributed resolver authorized by the DNS security service to provide DNS services to the enterprise organization.

11. The system of claim 10, wherein the DNS security service authorizes multiple distributed resolvers to provide DNS services to the enterprise organization and the HPP database is published, using a publish/subscribe messaging model, to the authorized distributed resolvers.

12. The system of claim 10, wherein the distributed DNS resolver is a Managed Service Provider (MSP).

13. The system of claim 8, wherein the PII associated with the client is maintained according to regulatory security requirements.

14. The system of claim 8, wherein the client hash value is added to an additional records section of a client DNS query.

15. One or more non-transitory computer-readable media storing instructions that, when executed, cause one or more processors to perform operations comprising:

Applying, by a policy engine hosted on premises at an enterprise organization, a cryptographic hash function to metadata including personally Identifiable Information (PII) associated with a client of the enterprise organization to generate a client hash value;

Creating, by the policy engine, a client Hash to Policy Pair (HPP) by mapping the client hash value to a set of DNS policy instructions associated with the client;

storing the client HPP in a HPP database; and publishing, by the policy engine the HPP database to a DNS security service, such that the DNS security service can resolve a DNS query for the client of the enterprise organization absent knowledge of the PII associated with the client by mapping the client hash value included in the DNS query to the client HPP in the HPP database.

16. The one or more non-transitory computer-readable media of claim 15, the operations further comprising:

updating the HPP database with an updated client HPP in response to a change in the set of DNS policy instructions associated with the client; and publishing the updated HPP database to the DNS service.

17. The one or more non-transitory computer-readable media of claim 15, the operations further comprising further comprising publishing the HPP database to a distributed resolver authorized by the DNS security service to provide DNS services to the enterprise organization.

18. The one or more non-transitory computer-readable media of claim 17, wherein the DNS security service authorizes multiple distributed resolvers to provide DNS services to the enterprise organization and the HPP database is published, using a publish/subscribe messaging model, to the authorized distributed resolvers.

19. The one or more non-transitory computer-readable media of claim 17, wherein the distributed DNS resolver is a Managed Service Provider (MSP).

20. The one or more non-transitory computer-readable media of claim 15, wherein the client hash value is added to an additional records section of a client DNS query.

* * * * *